…

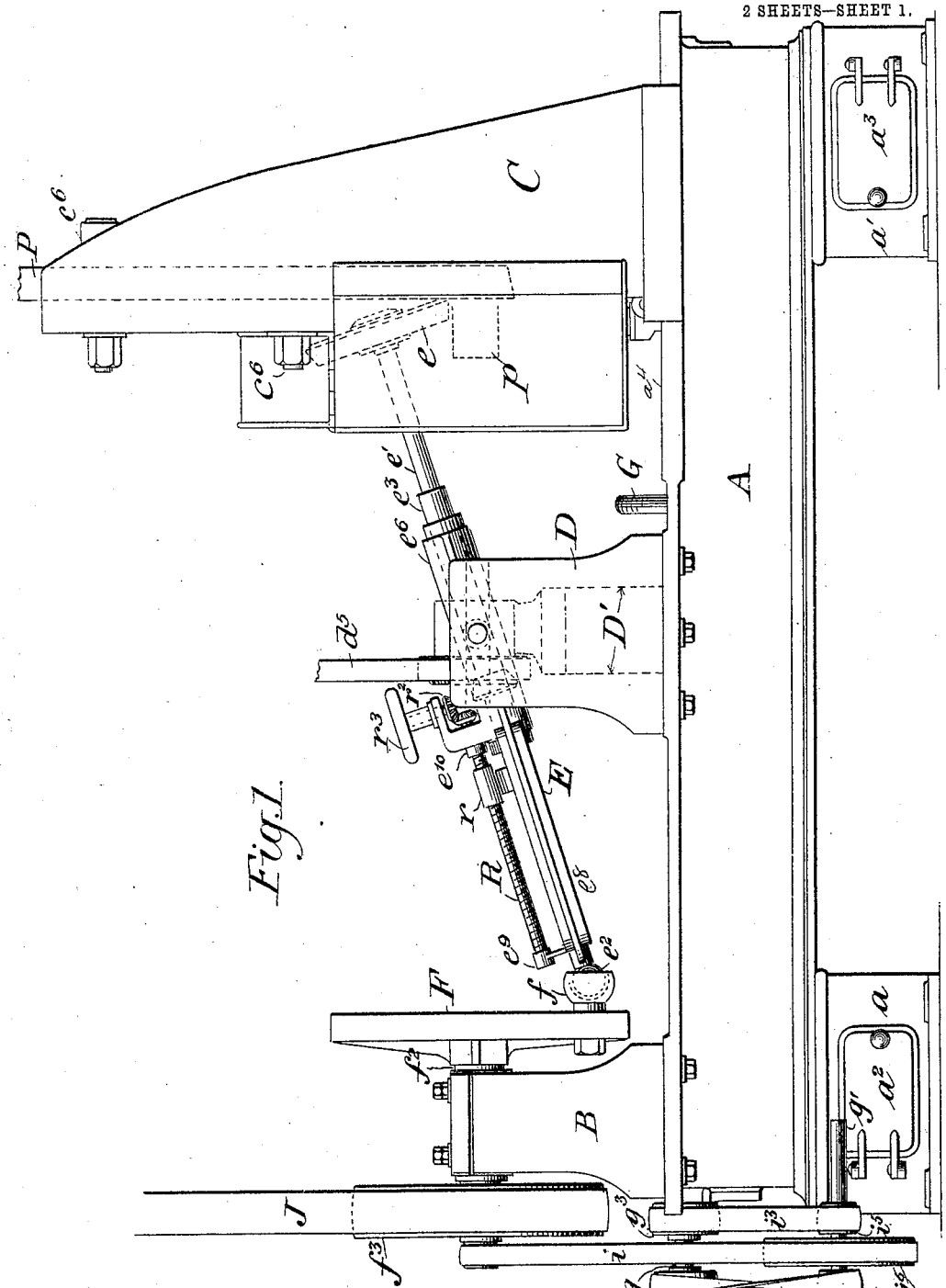

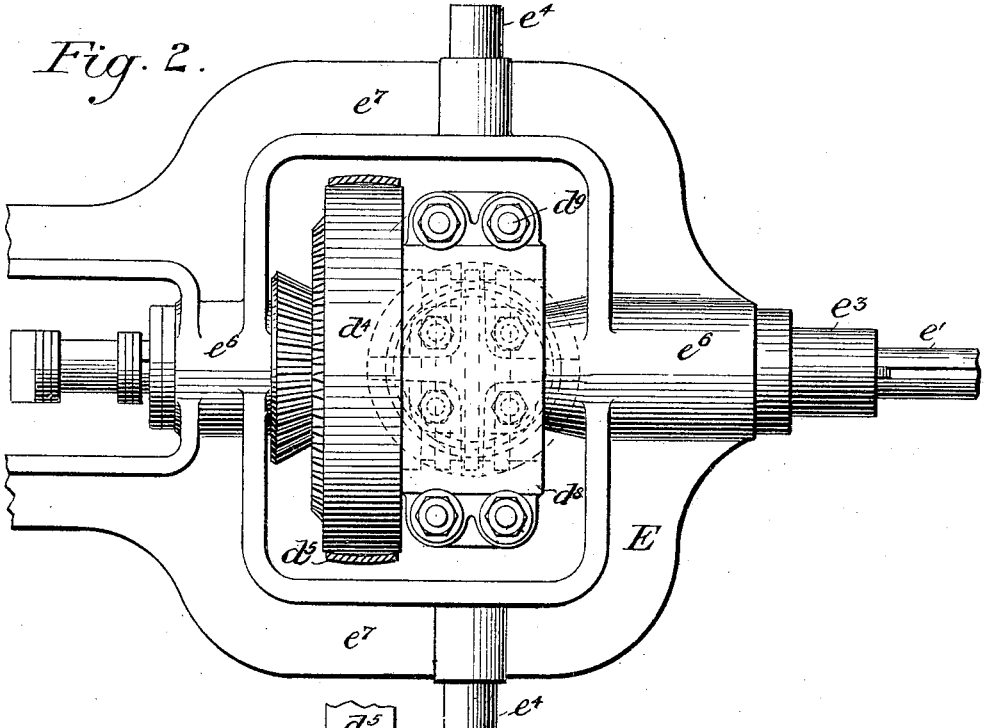
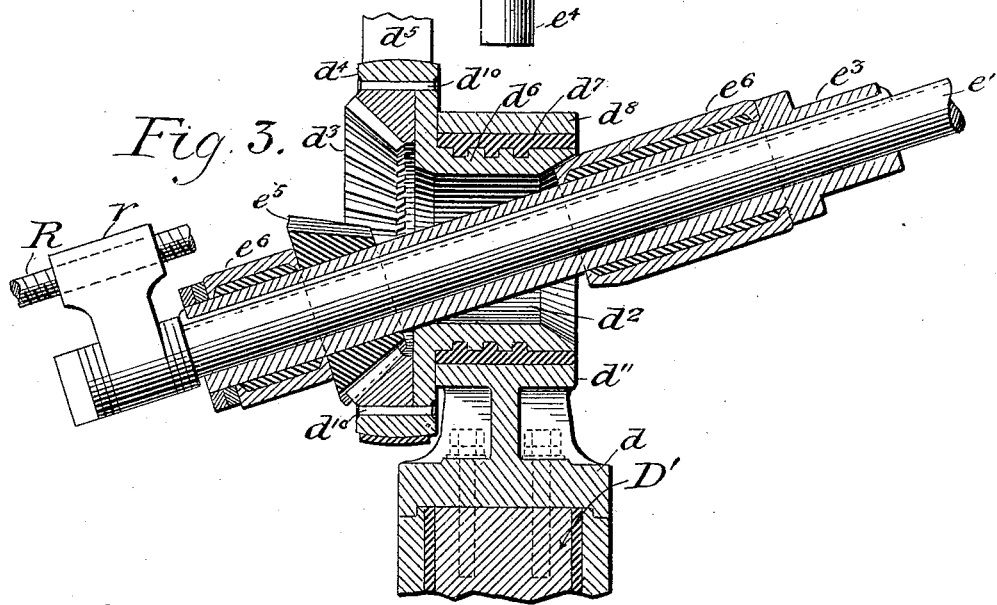

UNITED STATES PATENT OFFICE.

HENRY B. NICHOLS, OF PHILADELPHIA, PENNSYLVANIA.

GRINDING-MACHINE.

No. 807,194. Specification of Letters Patent. Patented Dec. 12, 1905.

Application filed February 28, 1905. Serial No. 247,746.

*To all whom it may concern:*

Be it known that I, HENRY B. NICHOLS, a citizen of the United States, residing at Philadelphia, in the county of Philadelphia and State of Pennsylvania, have invented certain new and useful Improvements in Grinding-Machines, of which the following is a specification, reference being had therein to the accompanying drawings.

My invention relates to grinding machinery, and particularly to such machines as are intended for handling irregular shapes or heavy masses which are incapable of rapid or easy bodily movement. Specifically stated, it has reference to machines for grinding the pivot-pins of switch-tongues as employed in railway practice. Such pins, which are very hard in their composition, nevertheless become worn from a circular to an irregular elliptical cross-section after some use and require regrinding or removal and replacement in order to keep up the standard of equipment. In another application, filed February 28, 1905, Serial No. 247,745, I have described and illustrated a machine particularly adapted for this work in which the switch-tongue or other heavy body is supported upon a heavy tail-block and a grinding-tool is carried upon a movable spindle mounted so as to have universal motion as well as longitudinal feed, whereby the grinding-head can be constantly driven and at the same time fed around the work, the latter being fed along to make a continuous cut. In said machine the supporting-yoke for the guide-spindle is carried on a fixed block or pillar, and as the dressing-tool or grinding-wheel is carried around the work, preferably by means of a heel-plate connection, the spindle is belt-driven to impart the necessary rotary motion. In the application referred to I have disclosed several arrangements of the belt-drive for the spindle, the simplest of which comprises a spherical pulley mounted on the spindle within its yoke to permit constant drive by lateral shifting of the belt on the surface of the pulley, while the latter and its yoke are oscillated to impart an orbital path to the ends of the spindle and a similar orbital path around the pin or other work to the grinding-wheel. With such a belt-drive and with the relatively high speed at which it is necessary to operate the spindle I have found there is a certain loss in efficiency as compared with a similar drive on a spindle or shaft having fixed bearings. In order to prevent this loss and to approximate the conditions present with fixed bearings, wherein the plane and the bodily position of the drive-pulley are fixed, I have described in said application and employed in practice a pulley having movement on the spindle and also a compensating belt with multiple turns or leads. With these devices I have achieved considerable success, although in none of them is the pulley itself fixed.

According to my present invention I provide a fixed pulley belt-driven, the relation of the belt and pulley being constant, and I gear the spindle to the pulley, so as to produce a positive drive while still permitting the universal motion of the spindle.

The object of the invention is to produce such positive drive as an improvement upon the apparatus described in the aforesaid application.

Generally stated, my present invention comprises a yoke having trunnions mounted in shoes to travel oppositely in two arcs or slideways, this yoke or bracket bearing carrying the spindle and surrounding a head-block or journal-bearing carried upon a pillar or support within the main tool-support upon which the slideways are mounted. This head-block, with its cap, is provided with internal bearings for a hollow stud or flange formed on one face of a drive-pulley having an internal bevel gear. The drive-spindle passes through the hollow stud, which has a sufficient internal diameter to permit of the universal motion, the spindle, or a driving-tube splined upon it, having a bevel-pinion meshing with the gear on the pulley in all positions of the spindle. This arrangement gives a positive drive with a fixed pulley and only such losses as are incidental to gear transmission.

The general construction of my present machine may be the same as that described in my aforesaid application, and I shall therefore confine my description almost entirely to the improvement I now seek to cover.

For convenience I shall herein indicate the parts of a machine described, so far as possible, by the same letters employed in the other application.

My invention is fully illustrated in the accompanying drawings, wherein—

Figure 1 is a side elevation of my grinding-machine provided with the improved tool-spindle-driving mechanism. Fig. 2 is a plan view of said mechanism on an enlarged scale, and Fig. 3 is a vertical longitudinal section through the same.

Referring first to Fig. 1, the reference-letter A represents the bed of the machine, which is or may be similar in construction to the bed of an engine-lathe and supported on pedestals or standards $a$ $a'$, which may conveniently be hollow, so as to be capable of use as receptacles for tools, &c., doors $a^2$ $a^3$ being preferably provided. Bolted to the upper surface of the bed A, near one end thereof, is the head-stock B, in which is journaled the live-spindle $f^2$, driven by a belt J on the pulley $f^3$, or by any other suitable means. The inner end of said live-spindle carries the face-plate F, to which is secured the semispherical socket member $f$, constructed to engage a conjugate ball-shaped member $e^2$ formed on the end of the yoke or bracket bearing E in which the tool-spindle $e'$ is journaled, as will be hereinafter further described. At about midway of the length of the bed A is bolted the tool-support D, which carries the bracket-bearing E. The latter is provided with trunnions $e^4$ $e^4$, which may be journaled in shoes (not shown) slidably mounted in the segmental guideways $d'$, carried on the support D, as shown and described in my application above referred to, whereby said bracket-bearing and tool-spindle are mounted for universal movement—that is to say, they can oscillate in both horizontal and vertical planes. The tool-spindle $e'$ is keyed in the sleeve $e^3$, so as to slide but not rotate therein, and a bevel-pinion $e^5$ is secured to said sleeve. The bracket-bearing E, which is or may be of the same form as that described in the companion application, consists of two cylindrical bosses $e^6$ $e^6$, connected by the yokes $e^7$ $e^7$, carrying the trunnions $e^4$ $e^4$ and passing around the central upper portion of the pulley-support D', as clearly shown in Fig. 2. The said cylindrical bosses $e^6$ $e^6$ constitute the journal-bearings for the sleeve $e^3$. The bracket-bearing E extends rearwardly in the form of a yoke $e^8$, which is provided on its end with the ball-shaped member $e^2$, above referred to. On the front end of the tool-spindle $e'$ is secured the cutting-tool $e$, shown as an emery-wheel, the periphery of which is suitably beveled to conform to the surface of the pivot-pin $p$ or other work. The switch-tongue, indicated at P, is clamped in the work-support C by suitable clamping means $c^6$ $c^6$ in a vertical position, so that the pin $p$, which is to be trued, projects horizontally toward the tool-support D. The work-support is slidably mounted on the ways of the bed A and is adapted to be fed along said ways by a lead-screw, the shaft $g$ of which only being shown, which can be rotated by the hand-wheel G or driven automatically in either direction from the live-spindle $f^2$. This mechanism and the means whereby the automatic feed is thrown out at predetermined points may be of any usual construction or may be that shown in my other application. It is therefore unnecessary to show or describe such mechanism and means in detail in this case, and I have illustrated in Fig. 1 only the following parts: The belt $i$, which is driven by the live-spindle $f^2$ and drives the pulley $i^6$ on the counter-shaft $g'$. The pulleys $i^4$ and $i^5$, carried by said counter-shaft, drive the loose pulleys $g^2$ $g^3$, carried by the lead-screw shaft $g$, in opposite directions by means of the crossed and straight belts $i^2$ $i^3$. A suitable clutch (not shown) connects either of said pulleys $g^2$ $g^3$ to the lead-screw $g$. The mechanism for feeding the tool-spindle $e'$ longitudinally in the sleeve $e^3$ may be the same as that disclosed in my said application, consisting of a feed-screw R, rotatably carried in bearings $e^9$ $e^{10}$, formed on the bracket-bearing E and engaging a nut $r$, secured to the rear end of said tool-spindle by any suitable means. The front end of said feed-screw R carries a bevel-gear $r'$, which meshes with a similar bevel-gear $r^2$, the spindle of which carries a hand-wheel $r^3$, by which the feed-screw can be rotated to feed the grinding-wheel spindle in its bearings.

Having thus described the machine itself, I will now set forth my improved drive mechanism for the spindle.

The tool-support D comprises two side members bolted to the bed-frame A and preferably cross-connected by suitable webs or flanges, which need no specific description or illustration. These webs may be united for the sake of strength to form one solid cross-body or block D'. (Shown in Fig. 1 in dotted lines and in Fig. 3 in section.) If the webs are made separate, however, this part D' becomes a post independently bolted to the bed A and upstanding between the two side supports. This part of the construction is a matter of efficient design merely and may therefore be varied without changing the invention. For convenience I shall call the part D' a "post." Upon the post D' is secured a cap $d$, carrying the journal-box $d^{11}$ for the pulley $d^4$. This journal box or bearing consists of the usual pillow-block with cap $d^8$ and cap-nuts $d^9$, inclosing the composition metal $d^7$. The pulley $d^4$ has its periphery slightly crowned, as usual, to take the belt $d^5$, and is keyed or otherwise rigidly secured to the hollow stud or bearing-sleeve $d^6$, which projects as an annular flange from the side of the pulley. In order to secure perfect rigidity, I prefer to form the bearing-sleeve $d^6$ and the pulley $d^4$ in one, but whether formed in this way or built up I provide an internal bevel-gear $d^3$, which is keyed into the pulley, as shown, the keys employed being headed over at both ends as rivets to hold the parts solidly together.

Upon the spindle $e'$ I secure the adjusting-block with feed-nut $r$, working on the feed-screw R. (Best shown in Fig. 1.) The spindle is journaled in the boxes $e^6$, carried on the bracket-bearing E, being splined in the sleeve $e^3$, which permits of longitudinal feed movement of the spindle in the sleeve while the latter furnishes the rotary bearing-surface. Rigidly secured upon the sleeve $e^3$, just within the after bearing $e^6$, is the bevel-pinion $e^5$, cut to mesh properly with the gear $d^3$. The bearing or contact circles of the gear and pinion having been determined and proper engagement secured by setting the socket $f$ on the face-plate F, this adjustment remains permanent for any given pair of gears. Obviously, however, the ratios and also the angle of the spindle may be changed by changing the gears and setting up the socket $f$ afresh. Under normal conditions the radial distance of the cutting edge of tool $e$ from the axis of the work $p$ is regulated through the feed-screw R. In fact, in all these machines I do not depend upon any other adjustment radially, except where it becomes necessary to change the size of the cutting-tool or grinding-head or to accommodate extra large work. As the pins $p$ run about the same sizes, such change is rarely necessary.

It will be observed from Figs. 1 and 3 that the spindle $e'$ and its bearing-sleeve $e^3$ pass through the open center $d^2$ of the pulley-sleeve $d^6$, the proportions of the parts being such and the edges of the pulley-sleeves being so beveled that the bracket-bearing E and the spindle may swing about their center without interference. This center lies in the axis of the pulley $d^4$ and its sleeve $d^6$, also in the axis of the trunnions $e^4$, also in the axis of the spindle. Hence the intersection of these three axes, which should also be in the vertical axis of the post D', is the center of motion of all the parts or dead-point, and this determines with perfect accuracy the face-lines of the teeth of the gear and pinion $d^3$ $e^5$. When these teeth are properly cut and set, therefore, they will engage with precision in all positions of the bracket and spindle. Thus I am enabled to secure a perfectly-uniform transmission of power to the spindle under all circumstances.

The operation of my improved machine will be sufficiently apparent from the foregoing description without a detailed statement.

The driving-belt for the spindle (indicated at $d^5$) and the driving-belt J for the tool-feed and rotation may take their power from the same shaft in proper ratios, the spindle of course running at a relatively high speed. In order to get the effect of summation, the directions of rotation should be opposite; but this is not at all essential.

It is apparent that many changes may be made in the specific embodiment of the ideas herein set forth without in any wise departing from the spirit of my invention, and I wish it distinctly understood that all such fall within the scope and purview of the invention. Thus instead of using a gear and pinion it would be possible for some classes of work to substitute a hollow conical friction-surface for the gear $d^3$ and a small plain friction-wheel $e^5$ for the bevel-pinion bearing the same letter. It would then be possible by shifting the pinion to change the speed of the spindle-drive, at the same time compensating by adjusting the socket $f$. Other changes will suggest themselves to those skilled in the art.

Having thus described my invention, what I claim, and desire to secure by Letters Patent of the United States, is—

1. In a machine of the class described, the combination of a tool-spindle, a dressing-tool secured to one end thereof, means to move said spindle so as to carry said tool around the work, a bevel-pinion secured to said spindle, an internal bevel-gear mounted in a fixed bearing so as to continuously mesh with and drive said pinion and spindle while the latter is at the same time carrying the tool around the work and means for feeding the tool-spindle.

2. In a machine of the class described, the combination of a tool-support, a work-support, a tool-spindle swiveled in said tool-support for universal movement, a grinding-wheel on the end of said spindle adjacent to said work-support, means to move said spindle so as to carry said wheel around the work, an internal bevel-gear journaled in said tool-support, a bevel-pinion secured to said spindle and meshing with said gear, whereby said spindle can be constantly rotated, while at the same time being carried around the work and means for feeding the tool-spindle.

3. In a machine of the class described, the combination with a tool-support, of a tool-spindle swiveled therein for universal movement, a pinion secured to said spindle an internal bevel-gear journaled for rotation in said tool-support and meshing with said pinion, whereby said spindle can be simultaneously rotated and given a universal motion and means for feeding the tool-spindle.

4. In a machine of the class described, the combination with a tool-support of a bracket-bearing swiveled therein for universal motion, a tool-spindle journaled in said bearing and provided with means to feed the same longitudinally in said bearing, a bevel-pinion secured to said spindle, an annular internal bevel-gear journaled in said support and surrounding said spindle, means to rotate said gear and thereby said pinion, also, and means to impart a universal motion to said bracket-bearing.

5. In a machine of the class described, the combination with a head-stock, a tool-support and a work-support, of a bracket-bearing swiveled for universal motion in said tool-support, a face-plate rotatably carried in said head-stock, a universal joint between said face-plate and bracket-bearing, a tool-spindle journaled in said bearing, a dressing-tool carried by said spindle, an annular, internal gear rotatably mounted in said tool-support, a conjugate pinion secured to said spindle so as to mesh with said gear, means to feed said work-support relatively to said tool-support, and means to drive said faceplate and annular gear, whereby the tool is rotated and simultaneously moved in a circular path around the work.

6. In a machine of the class described, the combination with a tool-support, of a tool-spindle swiveled therein, carrying a grinding-wheel, a bevel-pinion secured to said spindle, a combined annular, internal bevel-gear and pulley journaled in said support and surrounding said spindle, means to rotate said pulley means to move said spindle to carry said wheel around the work and means for feeding the tool-spindle longitudinally.

7. In a metal-working machine, a bed or support, a work-support mounted thereon, means for holding the work rigidly thereto, a tool-support, means for feeding the work-support a tool-holder having universal motion upon said tool-support, means for driving the tool so as to direct its cut, means for feeding the tool, fixed transmission means mounted on the tool-support and power-driven, together with conjugate transmission means upon or connected with the tool and so positioned relatively to the center of motion as to properly take power from the fixed transmission means in all positions of the tool, substantially as described.

8. In a grinding-machine, the combination with the frame thereof of a work-support and a tool-support, means for rigidly clamping work on the work-support, means for feeding the work-support toward the tool-support means movably supporting a tool on the tool-support, means to cause said tool to travel relatively to the work, and conjugate driving means having one element fixed with respect to the frame for receiving power from without, and a coöperating element connected to the tool and driven from the first element in all positions of the tool, substantially as described.

9. In a grinding-machine, the combination with a work-support of a tool-spindle, means to swing said spindle and thereby cause the tool to travel with respect to the work, means for feeding the tool longitudinally and tool-driving mechanism comprising two elements, one relatively fixed to receive power from without the machine, and the other movable with relation to the first during the swing of the spindle, but operatively connected to receive the transmitted power uniformly throughout its travel, substantially as described.

10. In a grinding-machine, a work-support, and a movable tool-holder, a tool-spindle adjustably carried by said holder, and a pair of gears, one carrying a pulley and driven from without the machine, the other secured to the spindle and meshing with the first throughout the movement of the tool-holder, substantially as described.

11. In a metal-working machine, a work-support, a tool-spindle and a swinging bracket-bearing therefor, a drive-pulley mounted to receive power from without the machine, and a pair of intermeshing gears connecting the drive-pulley and tool-spindle so as to transmit said power to the spindle in all positions of the latter.

In testimony whereof I affix my signature in presence of two witnesses.

HENRY B. NICHOLS.

Witnesses:
  C. B. VOYNOW,
  GEO. B. TAYLOR.